United States Patent
McPheeters

(10) Patent No.: US 9,057,195 B2
(45) Date of Patent: Jun. 16, 2015

(54) CAMMING CLAMP FOR ROOF SEAM

(71) Applicant: Greg McPheeters, Santa Clara, CA (US)

(72) Inventor: Greg McPheeters, Santa Clara, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 13/945,717

(22) Filed: Jul. 18, 2013

(65) Prior Publication Data

US 2013/0299657 A1 Nov. 14, 2013

Related U.S. Application Data

(60) Continuation of application No. 13/590,844, filed on Aug. 21, 2012, now Pat. No. 8,505,863, which is a division of application No. 12/470,588, filed on May 22, 2009, now Pat. No. 8,251,326.

(60) Provisional application No. 61/071,891, filed on May 22, 2008.

(51) Int. Cl.
*F16B 2/18* (2006.01)
*E04D 13/00* (2006.01)
*E04D 13/147* (2006.01)
*F24J 2/52* (2006.01)
*H01Q 1/12* (2006.01)
*F16B 37/04* (2006.01)
*F24J 2/46* (2006.01)

(52) U.S. Cl.
CPC ............ *E04D 13/00* (2013.01); *Y10T 403/7067* (2015.01); *Y10T 403/1683* (2015.01); *Y10T 24/44974* (2015.01); *Y10T 403/4677* (2015.01); *Y10T 403/4682* (2015.01); *E04D 13/1476* (2013.01); *F16B 37/045* (2013.01); *F24J 2/5203* (2013.01); *F24J 2/523* (2013.01); *F24J 2/5245* (2013.01); *F24J 2/5258* (2013.01); *F24J 2002/4661* (2013.01); *H01Q 1/1207* (2013.01); *Y02B 10/20* (2013.01); *Y02E 10/47* (2013.01); *F24J 2/5249* (2013.01); *Y02B 10/12* (2013.01)

(58) Field of Classification Search
USPC ............... 248/222.13, 228.51, 222.52, 228.2, 248/230.3, 231.31; 269/6, 3, 143, 249; 52/173.3, 24, 25, 26; 29/278, 257
See application file for complete search history.

(56) References Cited

U.S. PATENT DOCUMENTS

| | | | |
|---|---|---|---|
| 276,135 A | 4/1883 | Cooley | |
| 741,747 A | 10/1903 | Walz | |
| 1,316,084 A | 9/1919 | Dake | |
| 1,563,122 A | 1/1926 | Zifferer | 248/228.2 |

(Continued)

FOREIGN PATENT DOCUMENTS

JP           10223315 A   *  8/1998  .......... H01R 13/621

*Primary Examiner* — Alfred J Wujciak

(74) *Attorney, Agent, or Firm* — Kramer Levin Naftalis & Frankel LLP

(57) ABSTRACT

A clamp described herein can secure a solar cell array to a seam of a standing seam metal roof. The clamp has a cam that is rotated by the tightening of a bolt to cause the cam to engage the seam. The clamp also has a receiver for receiving the seam and the rotated cam. By installing the clamp on the seam, the solar cell array can be secured to the standing seam metal roof without drilling into the roof. Because no screws are required to be drilled into the rooftop, the damage to the rooftop is substantially reduced. Also, by reversing the process described above, the clamp can be uninstalled in a similar fashion.

20 Claims, 16 Drawing Sheets

(56) References Cited

U.S. PATENT DOCUMENTS

| | | | |
|---|---|---|---|
| 1,608,592 A | 11/1926 | Funk | 446/126 |
| 1,616,232 A | 2/1927 | Roberts et al. | |
| 1,724,394 A | 8/1929 | Chamberlain | |
| 2,182,480 A | 12/1939 | Lowry | |
| 2,253,241 A | 8/1941 | MacDonald | |
| 2,345,650 A | 4/1944 | Attwood | 403/21 |
| 2,380,379 A | 7/1945 | Attwood | 248/163.1 |
| 2,429,833 A | 10/1947 | Luce | |
| 2,676,680 A | 4/1954 | Kindorf | 403/22 |
| 2,696,139 A | 12/1954 | Attwood | 411/427 |
| 2,741,289 A | 4/1956 | Grow | |
| 2,833,326 A | 5/1958 | Karl | |
| 2,928,512 A | 3/1960 | Slater et al. | 403/22 |
| 2,944,642 A | 7/1960 | Evans | 403/22 |
| 3,019,887 A | 2/1962 | Lowden | |
| 3,043,408 A | 7/1962 | Attwood | 52/842 |
| 3,056,443 A | 10/1962 | Knocke | |
| 3,059,589 A | 10/1962 | Schreyer | |
| 3,124,330 A | 3/1964 | Robinson | 248/228.2 |
| 3,306,562 A | 2/1967 | Bellefleur | |
| 3,408,780 A | 11/1968 | Brister | 52/58 |
| 3,425,473 A | 2/1969 | Knowlton | |
| 3,434,748 A | 3/1969 | Leurent | 403/257 |
| 3,458,052 A | 7/1969 | Kann | 211/193 |
| 3,483,910 A | 12/1969 | LaLonde et al. | 411/112 |
| 3,493,025 A | 2/1970 | LaLonde et al. | 411/103 |
| 3,612,585 A | 10/1971 | Mayr | 403/264 |
| 3,778,175 A | 12/1973 | Zimmer | 403/187 |
| 3,966,342 A | 6/1976 | Moriya | 403/256 |
| 4,049,253 A | 9/1977 | Mandel | |
| 4,073,113 A | 2/1978 | Oudot et al. | 52/710 |
| 4,429,440 A | 2/1984 | Laughlin et al. | 24/486 |
| 4,533,277 A | 8/1985 | Alexander et al. | |
| 4,569,530 A | 2/1986 | Cross | |
| 4,575,295 A | 3/1986 | Rebentisch | 411/85 |
| 4,586,301 A | 5/1986 | Hickman | 52/96 |
| 4,764,340 A | 8/1988 | Lui et al. | |
| 4,783,040 A | 11/1988 | Lindberg et al. | 248/74.3 |
| 4,813,833 A | 3/1989 | Haab | |
| 4,830,531 A | 5/1989 | Condit et al. | 403/348 |
| 4,838,412 A | 6/1989 | Backman | 198/838 |
| 4,917,553 A | 4/1990 | Muller | 411/85 |
| 4,950,099 A | 8/1990 | Roellin | 403/348 |
| 4,957,402 A | 9/1990 | Klein et al. | 411/84 |
| 5,079,791 A | 1/1992 | Grech | |
| 5,087,879 A | 2/1992 | Sugifune et al. | |
| 5,116,161 A | 5/1992 | Faisst | 403/231 |
| 5,118,233 A | 6/1992 | Mitchell | 411/5 |
| 5,209,620 A | 5/1993 | Zare-Ardestani | |
| 5,259,165 A | 11/1993 | Koyama | |
| 5,269,784 A | 12/1993 | Mast | |
| 5,271,586 A * | 12/1993 | Schmidt | 248/58 |
| 5,316,244 A | 5/1994 | Zetena | 248/49 |
| 5,329,694 A | 7/1994 | Sickels et al. | |
| 5,340,251 A | 8/1994 | Takahashi et al. | |
| 5,345,737 A | 9/1994 | Latchinian | 52/280 |
| 5,351,926 A | 10/1994 | Moses | 248/354.5 |
| 5,352,078 A | 10/1994 | Nasu | |
| 5,413,437 A | 5/1995 | Bristow | |
| 5,433,053 A | 7/1995 | Tulloch | |
| D363,997 S | 11/1995 | Nomura | D25/122 |
| 5,464,232 A | 11/1995 | Chizmadia | |
| 5,481,842 A | 1/1996 | Gautreau | 52/656.9 |
| 5,520,292 A | 5/1996 | Lombardi | 211/85.6 |
| 5,531,552 A | 7/1996 | Takahashi et al. | |
| D378,047 S | 2/1997 | Chudoba | D8/354 |
| 5,636,426 A | 6/1997 | Luckhardt et al. | |
| 5,713,116 A | 2/1998 | Nickerson et al. | |
| 5,762,720 A | 6/1998 | Hanoka et al. | 136/251 |
| 5,797,573 A | 8/1998 | Nasu | |
| 5,797,581 A | 8/1998 | Sherman | |
| 5,800,436 A | 9/1998 | Lerch | |
| 5,875,600 A | 3/1999 | Redman | 52/656.4 |
| 5,946,797 A | 9/1999 | Kawabe et al. | |
| 5,988,930 A | 11/1999 | Liebetrau et al. | |
| 5,991,998 A | 11/1999 | Kaneko | |
| 6,086,300 A | 7/2000 | Frohlich | 411/84 |
| 6,216,997 B1 | 4/2001 | Short | |
| 6,220,804 B1 | 4/2001 | Pamer et al. | |
| 6,249,954 B1 | 6/2001 | Kawabe et al. | |
| 6,290,426 B1 | 9/2001 | van Gijsel et al. | 403/374.3 |
| 6,360,491 B1 | 3/2002 | Ullman | 52/22 |
| 6,364,262 B1 | 4/2002 | Gibson et al. | |
| 6,435,781 B1 | 8/2002 | Jones | |
| 6,450,475 B1 | 9/2002 | Tsai et al. | |
| 6,488,458 B2 | 12/2002 | Ninomiya et al. | |
| 6,526,701 B2 | 3/2003 | Stearns et al. | 52/24 |
| 6,571,407 B1 | 6/2003 | Skarie | |
| 6,591,475 B2 | 7/2003 | Ninomiya et al. | |
| 6,609,288 B2 | 8/2003 | Ninomiya et al. | |
| 6,612,642 B2 | 9/2003 | Kasahara | |
| 6,672,018 B2 | 1/2004 | Shingleton | 52/173.3 |
| 6,679,640 B2 | 1/2004 | Smith | |
| 6,712,540 B2 | 3/2004 | Schmalzhofer et al. | 403/248 |
| 6,712,543 B1 | 3/2004 | Schmalzhofer | 403/381 |
| 6,712,568 B2 | 3/2004 | Snyder et al. | 410/104 |
| 6,719,481 B2 | 4/2004 | Hoffmann | 403/403 |
| 6,739,038 B2 | 5/2004 | Herold | |
| 6,745,443 B2 | 6/2004 | Matsumoto et al. | |
| 6,751,851 B2 | 6/2004 | Ninomiya et al. | |
| 6,751,854 B2 | 6/2004 | Takiyama | |
| 6,751,914 B2 | 6/2004 | Zeh et al. | 52/239 |
| 6,757,953 B2 | 7/2004 | Matsumoto et al. | |
| 6,758,014 B2 | 7/2004 | Chen | 52/63 |
| 6,804,871 B1 | 10/2004 | Smith | |
| 6,807,791 B2 | 10/2004 | Herb | 52/846 |
| 6,827,531 B2 | 12/2004 | Womack et al. | 410/104 |
| 6,846,140 B2 | 1/2005 | Anderson et al. | 410/104 |
| 6,872,038 B2 | 3/2005 | Westlake | 411/85 |
| 6,877,199 B2 | 4/2005 | Cassese et al. | |
| 6,910,609 B2 | 6/2005 | Williams et al. | 224/519 |
| 6,962,591 B2 | 11/2005 | Lerch | |
| 7,004,667 B2 | 2/2006 | Ludwig et al. | 403/258 |
| 7,073,995 B2 * | 7/2006 | Herb | 411/85 |
| 7,111,909 B2 | 9/2006 | Andersen | |
| 7,124,492 B2 | 10/2006 | Wojciechowski et al. | |
| 7,178,880 B2 | 2/2007 | Andersen | |
| 7,246,547 B2 | 7/2007 | Van Walraven | 81/461 |
| 7,249,624 B2 | 7/2007 | Zeh et al. | 160/371 |
| 7,260,918 B2 | 8/2007 | Liebendorfer | 52/173.3 |
| 7,275,903 B2 | 10/2007 | Schultz | |
| 7,281,889 B2 | 10/2007 | Anderson et al. | 410/104 |
| 7,338,245 B2 | 3/2008 | Ladouceur | 411/427 |
| 7,341,413 B2 | 3/2008 | Morris et al. | |
| 7,386,922 B1 | 6/2008 | Taylor et al. | |
| 7,389,621 B2 | 6/2008 | Hawes | 52/655.1 |
| 7,434,362 B2 | 10/2008 | Liebendorfer | 52/173.3 |
| 7,434,364 B2 | 10/2008 | MacDermott et al. | |
| 7,475,466 B2 | 1/2009 | Marume et al. | |
| 7,594,787 B2 * | 9/2009 | Womack et al. | 410/104 |
| 7,600,349 B2 | 10/2009 | Liebendorfer | 52/173.3 |
| 7,604,429 B2 | 10/2009 | Prange | 403/403 |
| 7,604,444 B2 | 10/2009 | Wu | 411/85 |
| 7,621,487 B2 | 11/2009 | Brown et al. | 248/65 |
| 7,634,875 B2 | 12/2009 | Genschorek | 52/173.3 |
| 7,650,716 B1 | 1/2010 | Schemeley | 47/23.1 |
| 7,748,175 B2 | 7/2010 | Liebendorfer | 52/173.3 |
| 7,766,292 B2 | 8/2010 | Liebendorfer | 248/237 |
| 7,780,472 B2 | 8/2010 | Lenox | |
| 7,797,883 B2 | 9/2010 | Tarbell et al. | 52/27 |
| 7,797,906 B2 | 9/2010 | Kassem | 52/713 |
| D627,717 S | 11/2010 | Munoz et al. | D13/102 |
| 7,849,576 B2 | 12/2010 | Sawada et al. | |
| 7,861,485 B1 | 1/2011 | Wentworth et al. | 52/745.06 |
| 7,874,774 B2 | 1/2011 | Peterson | 410/104 |
| 7,921,607 B2 | 4/2011 | Thompson et al. | 52/60 |
| 7,971,398 B2 | 7/2011 | Tweedie | 52/173.3 |
| 8,251,326 B2 * | 8/2012 | McPheeters | 248/228.2 |
| 8,505,863 B2 * | 8/2013 | McPheeters | 248/228.2 |
| 2002/0046506 A1 | 4/2002 | Ullman | 52/1 |
| 2002/0066235 A1 | 6/2002 | Stearns et al. | 52/24 |
| 2003/0015637 A1 | 1/2003 | Liebendorfer | 248/237 |
| 2003/0049094 A1 | 3/2003 | Westlake | 411/84 |
| 2003/0101662 A1 | 6/2003 | Ullman | 52/27 |

(56) References Cited

U.S. PATENT DOCUMENTS

| | | | |
|---|---|---|---|
| 2003/0177706 A1 | 9/2003 | Ullman | 52/3 |
| 2003/0198530 A1 | 10/2003 | Hoffmann et al. | 411/84 |
| 2003/0206785 A1 | 11/2003 | Hoffmann et al. | 411/84 |
| 2004/0163338 A1 | 8/2004 | Liebendorfer | 52/173.1 |
| 2004/0165965 A1 | 8/2004 | Unverzagt et al. | 411/84 |
| 2005/0036848 A1* | 2/2005 | Cunningham et al. | 410/104 |
| 2005/0226683 A1 | 10/2005 | Herb | 403/230 |
| 2006/0156648 A1 | 7/2006 | Thompson et al. | 52/173.3 |
| 2008/0010915 A1 | 1/2008 | Liebendorfer | 52/173.3 |
| 2008/0121273 A1 | 5/2008 | Plaisted et al. | 136/251 |
| 2010/0041486 A1 | 2/2010 | Selle | |
| 2010/0088996 A1 | 4/2010 | Thompson et al. | 52/704 |
| 2010/0170163 A1 | 7/2010 | Tarbell et al. | 52/27 |
| 2010/0192505 A1 | 8/2010 | Schaefer et al. | 52/653.2 |
| 2010/0263297 A1 | 10/2010 | Liebendorfer | 52/11 |
| 2010/0276558 A1 | 11/2010 | Faust et al. | 248/222.14 |
| 2011/0036028 A1 | 2/2011 | Beck | |
| 2011/0120047 A1 | 5/2011 | Stearns et al. | 52/698 |

\* cited by examiner

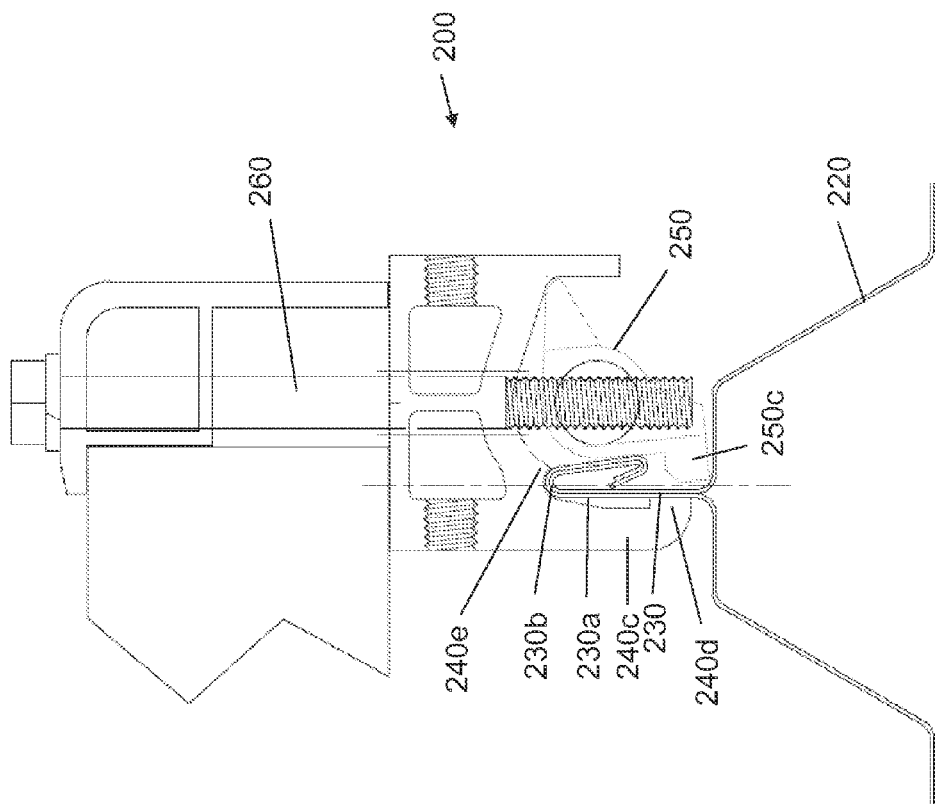

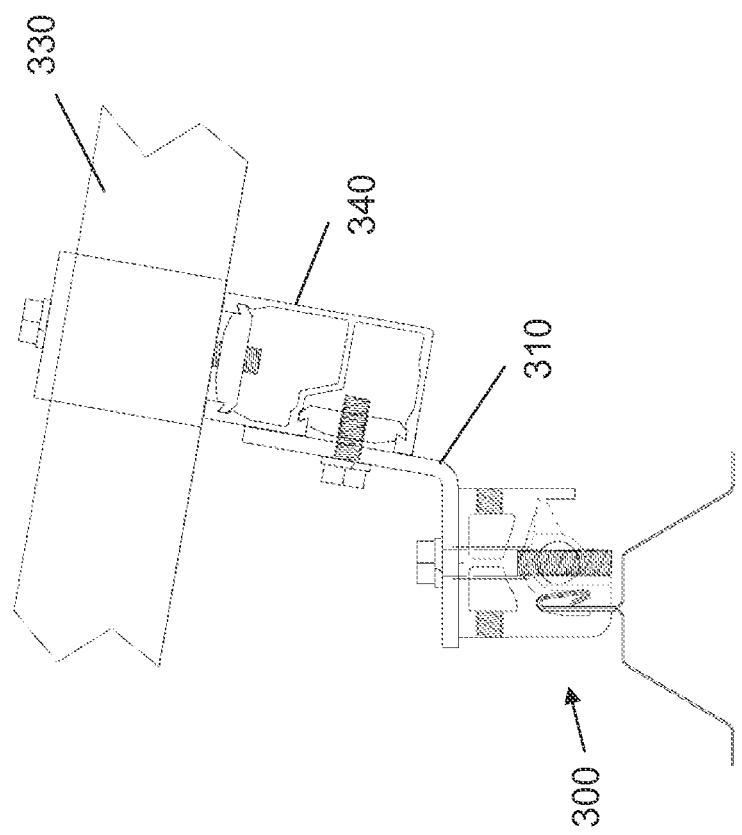

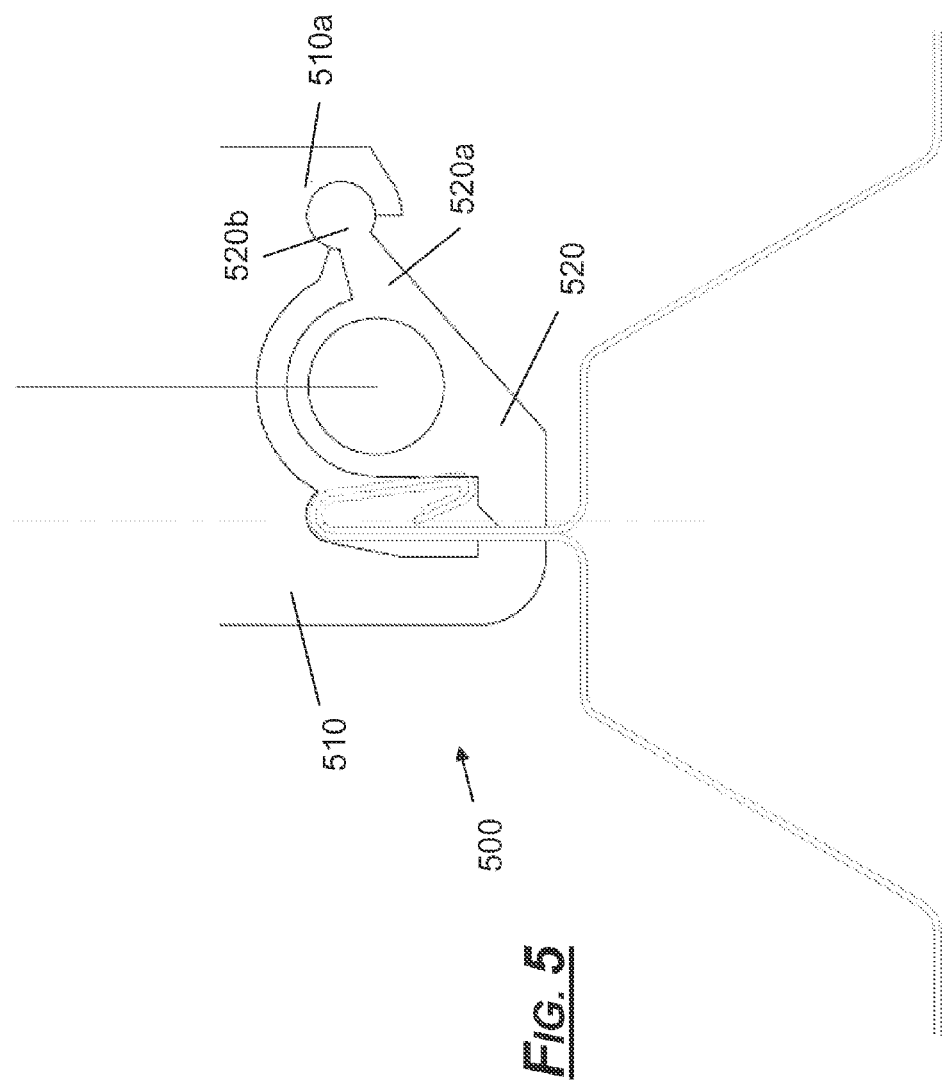

CAMMING CLAMP FOR ROOF SEAM

CROSS-REFERENCE TO RELATED APPLICATIONS

This application is a continuation of U.S. patent application Ser. No. 13/590,844, filed Aug. 21, 2012, which is a divisional of U.S. patent application Ser. No. 12/470,588, filed May 22, 2009 (now U.S. Pat. No. 8,251,326), which claims priority to U.S. Provisional Patent Application Ser. No. 61/071,891, entitled "Device and Method for Solar Panel Installation," filed May 22, 2008, which are hereby incorporated by reference in their entirety. This application is related to U.S. Pat. No. 8,585,000, entitled "Universal End Clamp," which issued on Nov. 19, 2013, and U.S. Pat. No. 8,250,829, entitled "Module Attachment Apparatus," which issued on Aug. 8, 2012.

FIELD OF THE INVENTION

The invention relates generally to a clamp for securing a solar cell array or component thereof to a roof seam.

BACKGROUND

Solar energy generation is a rapidly growing technology worldwide and offers the potential of almost unlimited clean and sustainable energy. However, the use of solar electric technology has been limited by the costs associated with installing solar panels to existing and new structures and facilities.

Solar cell array installation is a very specialized line of work and requires special equipment and expertise. Because solar modules need maximum exposure to sunlight to operate efficiently, they are often installed on the rooftops of structures or buildings. Rooftops are convenient because they typically represent unused space on a structure. Rooftops are also less prone to vandalism or theft than locations that are accessible from the ground. White rooftops are often good locations to install solar modules, they introduce a number of complications into the installation process. Most notably, rooftop installations introduce increased risk of water leakage as components are fixed through roofing membranes and into structural members below. Rooftop surfaces are often visible and require a smooth, level installation, which is often at odds with the undulating, settled surfaces common in roof surfaces. Working on roof surfaces typically introduces numerous access and safety challenges which must be overcome, and therefore limiting the amount of time for installation or maintenance on the roof is highly advantageous to an installer.

For these reasons, it is desirable to have a solar cell array mounting solution that offers robust protection against the elements, has an adaptive configuration for accommodating roof and other mounting surface irregularities, and contains features that make installation as quick and efficient as possible to minimize installation time on the roof.

Solar panel performance is closely tied to the orientation of a module as it operates. Because systems to track the sun can be expensive and can require a lot of surface area of a roof, modules are typically mounted fixed in the orientation that yields the best annual energy or cost performance. Tilt angles in the range of 10 to 20 degrees are most common, with higher angles found in higher latitudes or off-grid systems with greater demand for production in winter months. For this reason, some complete solar cell array installation solutions include tilt options for the modules when they are installed on flat or low tilt situations.

Large commercial roof spaces are often subject to this flat roof, tilt configuration requirement. However, due to the complexity of commercial roof construction and the high reliability requirement of commercial roof membranes, roof penetrations may be exceedingly expensive in commercial applications. A system that allows large commercial arrays to be tilted to their optimum orientation while also significantly reducing the number of roof penetrations may be advantageous for the commercial systems integrator.

SUMMARY OF THE INVENTION

Various embodiments described herein attempt to overcome the drawbacks of the conventional techniques and devices for solar cell array installation.

The systems, methods, and devices described herein can offer, among other advantages, decreased cost of installing solar cell arrays or components thereof. This can be accomplished in an efficient and robust manner compared with the current installation techniques and devices. The systems, methods, and devices can be installed without drilling components during installation. Because no screws are required to be drilled into the rooftop, the damage to the rooftop is substantially reduced or eliminated entirely. Also, the modular nature can allow for easier installation and breakdown.

Commercial systems are often installed on rooftops with standing seam metal roofs. These roofs are popular for their cost efficiency and longevity. The standing seams of these rooftops provide a unique attachment point, if the vertical standing seams can be adequately "clamped" so they can support the often significant weight and windloading requirements of solar panels. A quick, easy to use clamp mechanism may save a tremendous amount of labor during installation, but may also provide for a complete system installation that adds no new penetrations to the roofing membrane.

In one embodiment, a clamp for securing a module to a roof seam comprises a cam receiver, a cam, and a bolt. The cam receiver comprises a horizontal component configured to abut the module and a module clamp; a first vertical component extending from a first end of the horizontal component, the vertical component further comprising a flange configured to abut the roof seam; and a second vertical component extending from a second end of the horizontal component, wherein the horizontal component and the first vertical component form a first corner, and the horizontal component and the second vertical component form a second corner. The cam comprises a first cam component configured to abut the second corner; a threaded cam insert extending from the first cam component; and a second cam component extending from the threaded cam insert, wherein the second cam component is configured to abut the roof seam. The bolt comprises a threaded component, wherein the bolt extends from the module clamp through the horizontal component of the cam receiver and the threaded component extends to the threaded cam insert of the cam. The bolt is configured to engage the threaded cam portion of the cam and cause the cam to rotate toward the cam receiver, whereby the flange of the vertical component abuts the roof seam, the second cam component abuts the roof seam, and the roof seam abuts the first corner.

In another embodiment, a system for clamping a solar module or rail to a roof seam comprises a module clamp, such as a module end clamp or a mid clamp; a cam receiver; a cam; and a bolt. The module end clamp comprises an upper surface component; a module clamp flange extending from the upper surface component and configured to abut a first side of the solar module or rail; and a vertical module clamp component extending perpendicular to the upper surface component. The cam receiver comprises a horizontal component configured to abut a second side of the solar module or rail and the vertical module clamp component; a first vertical component extending from a first end of the horizontal component, the vertical component further comprising a flange configured to abut the roof seam; and a second vertical component extending from a second end of the horizontal component, wherein the horizontal component and the first vertical component form a first corner, and the horizontal component and the second vertical component form a second corner. The cam comprises a first cam component configured to abut the second corner; a threaded cam insert extending from the first cam component; and a second cam component extending from the threaded cam insert, wherein the second cam component is configured to abut the roof seam. The bolt extends from the upper surface component of the module clamp through the horizontal component of the cam receiver and into the threaded cam insert of the cam. The bolt is configured to engage the threaded cam portion of the cam and cause the cam to rotate toward the cam receiver, whereby the flange of the vertical component abuts the roof seam, the second cam component abuts the roof seam, and the roof seam abuts the first corner.

In yet another embodiment, a clamp for securing a module to a roof seam comprises a cam means for abutting the roof seam; a cam receiving means for receiving the cam and abutting the roof seam, wherein the cam receiving means abuts the module; and a cam adjusting means for causing the cam to rotate and securing a module clamp to the cam receiving means, wherein the module is positioned between the an end of the module clamp and the cam receiving means.

Additional features and advantages of an embodiment will be set forth in the description which follows, and in part will be apparent from the description, or may be learned by practice of the invention. The objectives and other advantages of the invention will be realized and attained by the structure particularly pointed out the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures:

FIG. 2c shows a cross-section of a clamp in a third installation position according to an alternative exemplary embodiment.

FIG. 3b is a cross-sectional view of a module and clamp assembly according to an exemplary embodiment.

FIG. 5 is a cross-sectional view of a clamp according to an alternative exemplar embodiment.

DETAILED DESCRIPTION

Reference will now be made in detail to the preferred embodiments of the present invention, examples of which are illustrated in the accompanying drawings.

Figure 1A:
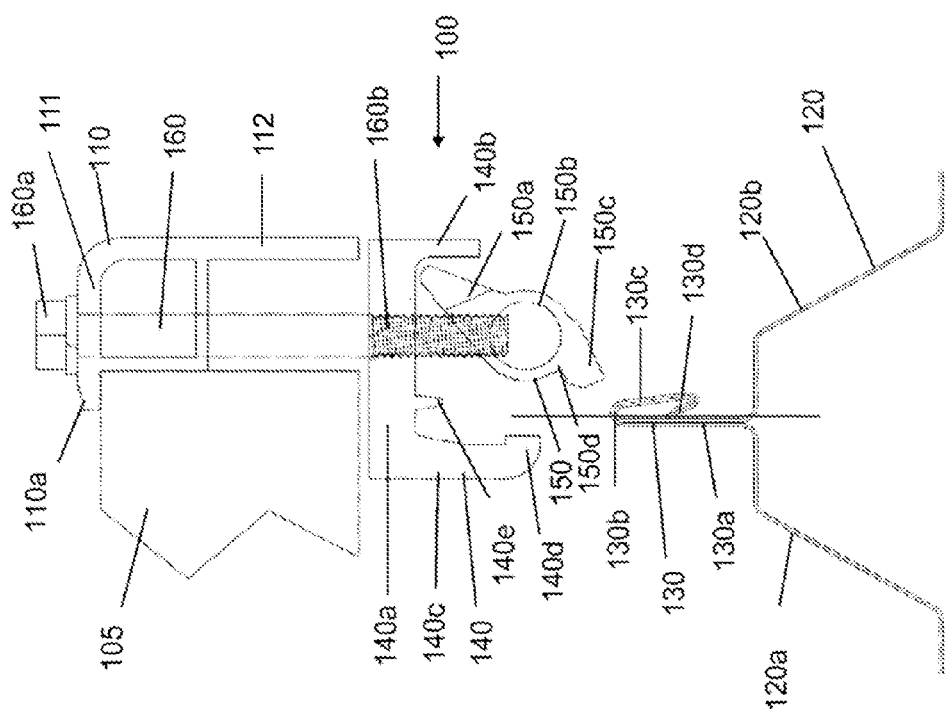
FIG. 1a shows a cross-section of a clamp in a first installation position according to an exemplary embodiment.

FIGS. 1a to 1d show a cross-sectional view of a clamp 100 throughout various stages of installation. Referring to FIG. 1a, the clamp 100 can be used to secure or directly support a solar module 105 having a module end clamp 110. Although a solar module is described herein, it is intended to include any component of a solar cell array to be secured, including, but not limited to, a photovoltaic array, a photovoltaic module, a solar cell, a rail, a solar panel, a solar tracker, a mounting post or pole, a mounting bracket, or other related hardware. Additionally, although a module end clamp is shown in this exemplary embodiment, it is intended to include any configuration having a mid clamp or rail application.

The module end clamp 110 has a clamp flange 110a that extends over the module 105 from an upper surface component 111 to secure the module to a structure or roof. Optionally, the clamp flange 110a can have a ridged or toothed surface to assist with gripping the module 105. As the module end clamp 110 is fastened in a downward position, the module 105 will be secure between module end clamp flange 110a and clamp receiver horizontal component 140a. Although a module end clamp is shown, it is intended that the clamp 100 can be used with any structural member, such as an L-foot or rail.

The clamp 100 can secure the module end clamp 110 to a standing seam metal roof 120 having a seam 130. Although this exemplary embodiment may be operable with a variety of seams, it is intended that one of ordinary skill in the art could configure the clamp to operate with other seams. Seam 130 couples a first metal roof panel 120a and a second metal roof panel 120b. Seam 130 has a first vertical component 130a, a horizontal component 130b extending from the first vertical component 130a, a second vertical component 130c extending toward the roof 120 from the horizontal flange 130b, and an end component 130d that extends from the second vertical component 130c toward the first vertical component 130a. The seam 130 has an extension of roof panel 120a and roof panel 120b that extends throughout the seam 130 to produce a watertight seal. Although the exemplary embodiment depicts a standing seam metal roof having mechanical seam or crimp, it is intended that the clamp can be configured for or applied to a standing metal seam roof having a panel interlock.

Figure 4:
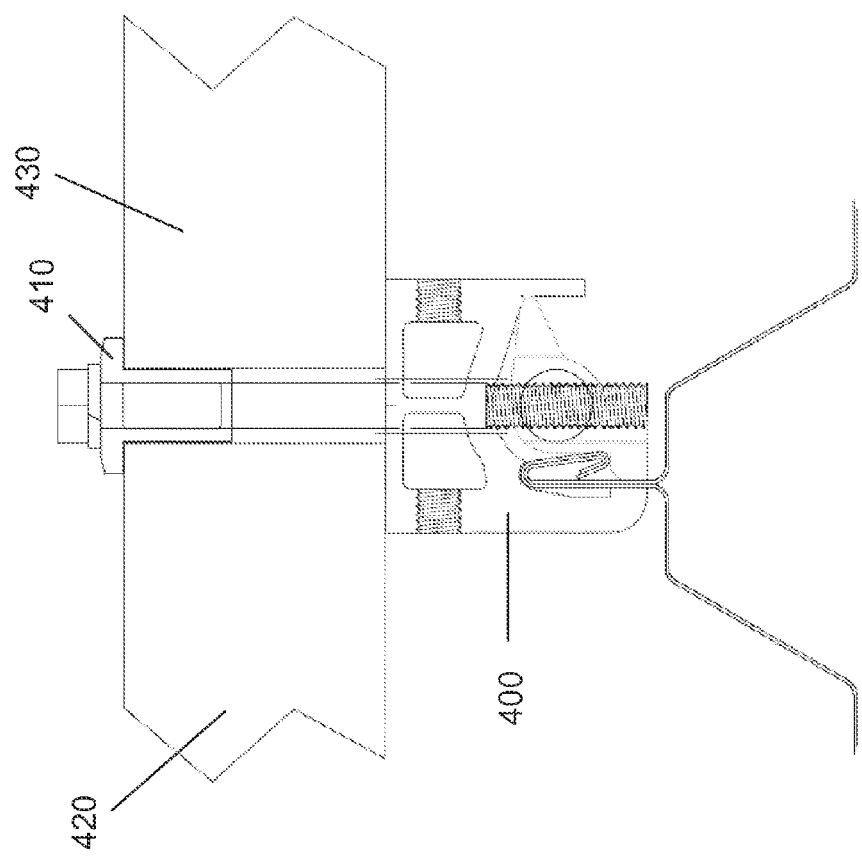
FIG. 4 is a cross-sectional view of a clamp according to an exemplary embodiment.

The clamp 100 has a clamp receiver 140 and a clamp cam 150 configured to rotate into the clamp receiver 140. The clamp receiver 140 has a horizontal component 140a that supports the module 105 and abuts an end of a vertical module end clamp component 112 of the module end clamp 110 or two modules when used with a mid clamp (as shown in FIG. 4). The clamp receiver 140 has a cam receiving flange 140b extending vertically toward the roof 120 from the horizontal component 140a. The clamp receiver 140 also has a vertical component 140c extending toward the roof 120 from the horizontal component 140a. The vertical component 140c is positioned at a distal end of horizontal component 140a, whereas the cam receiving flange 140b is positioned at the other distal end of the horizontal component 140a. The vertical component 140c has an inwardly directed flange 140d that is operable to abut the seam 130. The clamp receiver 140 also has a seam receiving flange 140e configured to create a void between the seam receiving flange 140e and the vertical component 140c for receiving the seam 130.

The clamp 100 has a cam 150 that rotates about a pivot point substantially near the corner where the horizontal component 140a and the cam receiving flange 140b are coupled. The cam 150 has a first cam component 150a that extends from the pivot point to a cam thread insert 150b. The cam insert 150b is a cylindrical component that fits within cam 150. The cam insert 150b has a threaded aperture for receiving the bolt 160, which when rotated, causes the cam insert 150b (along with the cam 150) to move up and down the bolt 160. A second cam component 150c extends from the cam thread insert 150b and forms a corner 150d. The second cam component 150c has a distal end configured to abut the seam 130. The corner 150d is configured to abut the seam 130 at the junction of the second vertical flange 130c and the end component 130d.

A torque bolt 160 extends from the upper portion surface component 111 of the module end clamp 110 and through the clamp 100 to the cam thread insert 150b. The bolt 160 has a polygonal component 160a at a distal end that extends beyond the module end clamp 110 and can be used to engage or disengage the bolt 160 from the cam thread insert 150b. It is intended that the bolt 160 can have any configuration at the distal end that allows a user to rotate the bolt or allows the bolt to engage the cam 150, such as a screwdriver receiving recess, and is not limited to a polygonal component, such as a hexagonal or pentagonal shaped component. At the other end of the module end clamp 110 (or mid clamp), the bolt 160 has a threaded component 160b that extends through the horizontal component 140a to the cam thread insert 150b. The cam thread insert 150b has a thread that is configured to receive the threaded component 160b of the bolt 160. This exemplary configuration of the bolt 160 can assist in securing the cam 150 in the clamp 100.

As shown in FIG. 1a, the installation process begins with the clamp 100 having the cam 150 in an open position and the bolt 160 is not extended into the cam thread insert 150b. As the installation process continues, the clamp 100 is lowered onto the seam 130 and the bolt 160 engages the cam thread insert 150b to rotate the cam 150 into position abutting the seam 130.

Figure 1B:
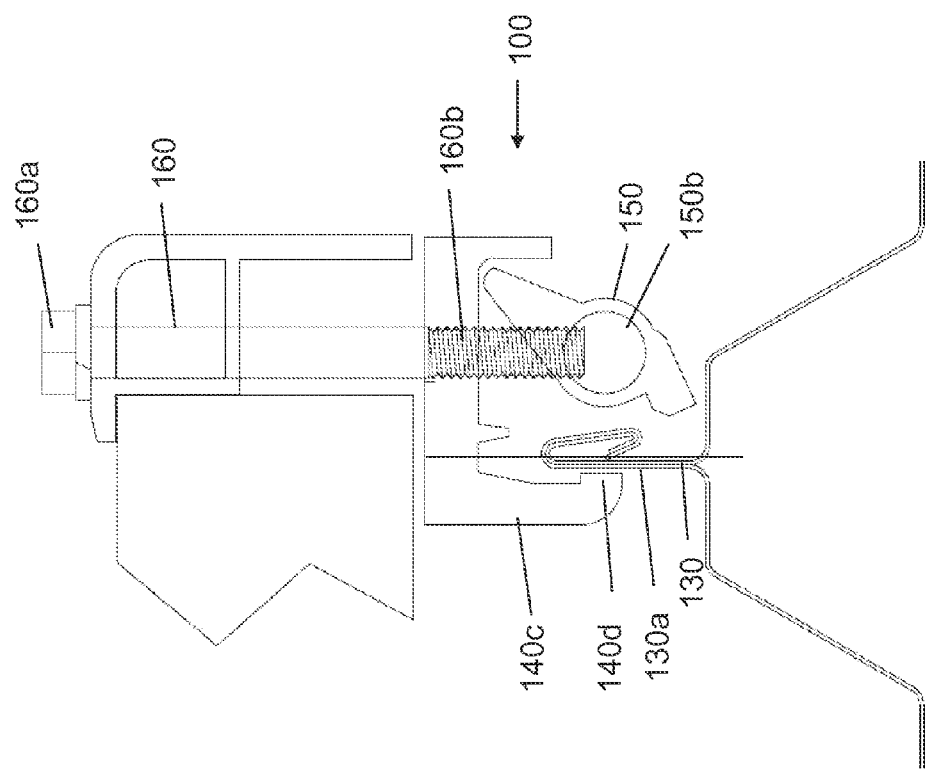
FIG. 1b shows a cross-section of a clamp in a second installation position according to an exemplary embodiment.

FIG. 1b shows the clamp 100 being lowered onto the seam 130. By rotating the polygonal component 160a of the bolt 160, the threaded component 160b engages the cam thread insert 150b and causes the cam 150 to rotate towards the vertical component 140c. The inwardly directed flange 140d of the vertical component 140c abuts the first vertical flange 130a of the seam 130.

Figure 1C:
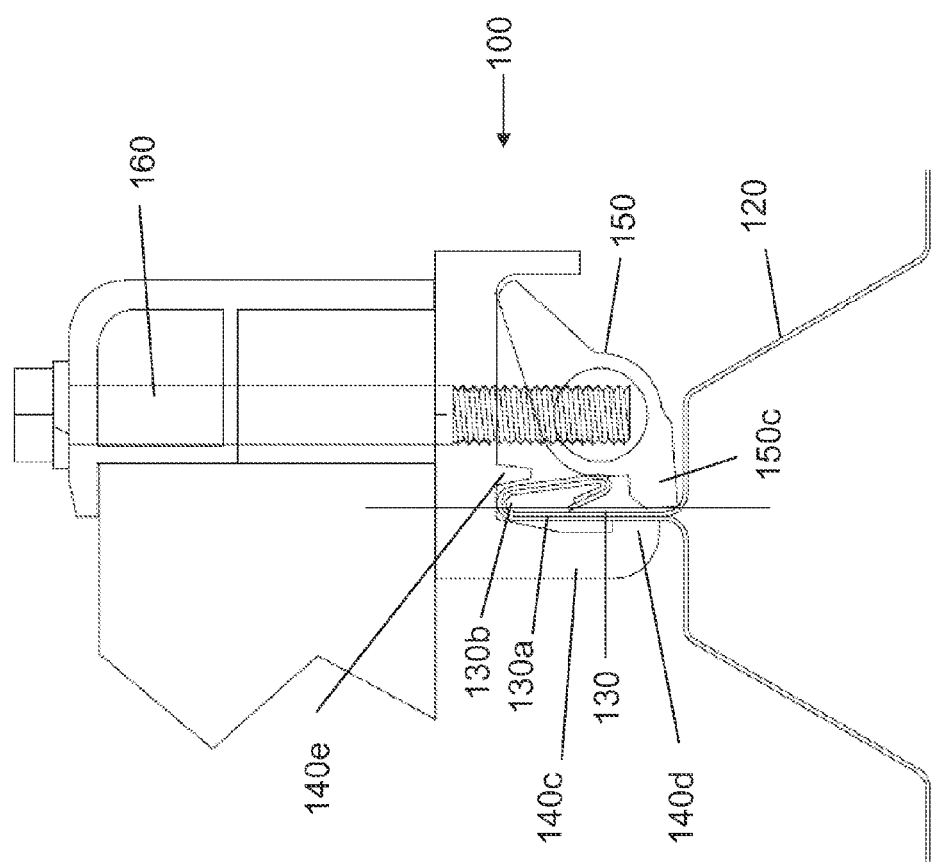
FIG. 1c shows a cross-section of a clamp in a third installation position according to an exemplary embodiment.

FIG. 1c shows the clamp 100 being lowered further onto the roof 120. As the bolt 160 is rotated, the cam 150 continues to rotate to engage the seam 130. The horizontal component 130b of the seam 130 abuts the void between the seam receiving flange 140e and the vertical component 140c. The inwardly directed flange 140d remains abutted against the vertical component 130a of seam 130. The second cam component 150c also abuts the vertical component 130a of seam 130. In this position in installation, the cam 150 has been rotated to substantially close the opening to secure the clamp 100 to seam 130.

Figure 1D:
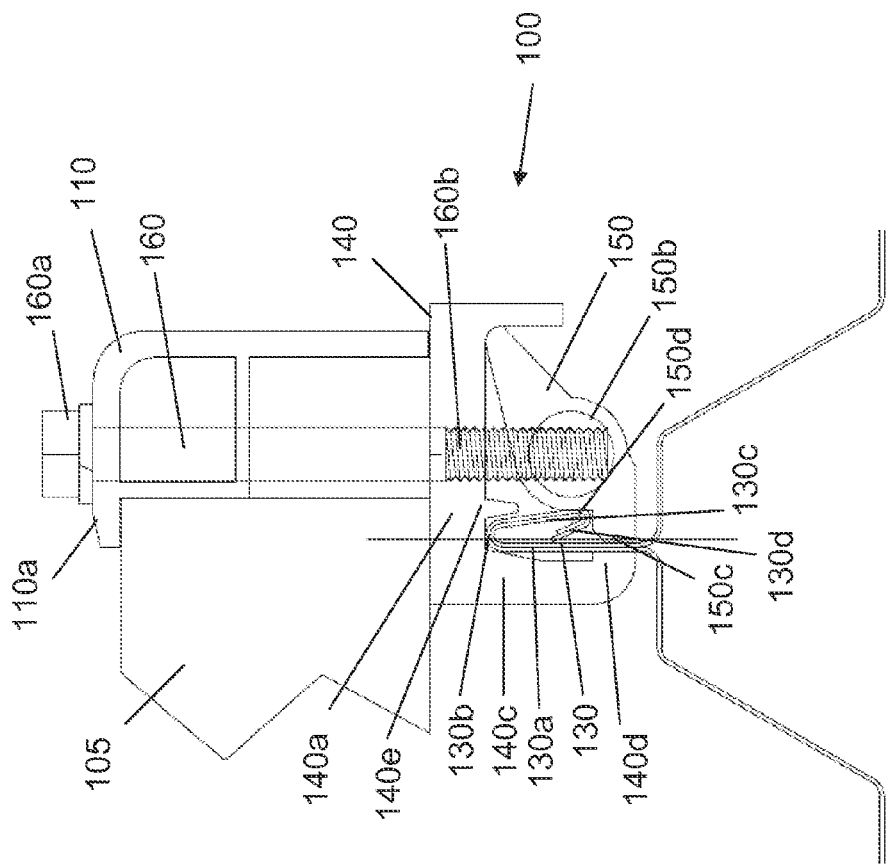
FIG. 1d shows a cross-section of a clamp in a fourth installation position according to an exemplary embodiment.

FIG. 1d shows a tightening of the clamp 100 to the seam 130. The polygonal component 160a of bolt 160 can be rotated until the clamp 100 is in a desired securing position, in one exemplary embodiment, the bolt 160 is rotated to 10 ft-lbs. The threaded component 160b of the bolt 160 continues to engage the cam thread insert 150b until the cam 150 is substantially in a final, secure position and the cam 150 cannot be rotated further. In this final position, as shown in FIG. 1d, the inwardly directed flange 140d remains abutted against the vertical component 130a of seam 130. The horizontal component 130b of the seam 130 abuts the void between the seam receiving flange 140e and the vertical component 140c. The second cam component 150c abuts the vertical component 130a of seam 130. The corner 150d abuts the seam 130 at the junction of the second vertical flange 130c and the end component 130d. Accordingly, the cam 150 cannot rotate further because the cam 150 is pressed against the seam 130 at these two points. Also, by tightening the bolt 160, the module end clamp 110 is secured against the clamp 100. As a result, the module 105 is secured between the flange 110a and the horizontal component 140a of the clamp receiver 140.

The clamp 100, including the clamp receiver 140, cam 150, and bolt 160, can be composed of any known or convenient material, including, but not limited to metal, fiberglass, plastic, wood, composites or any other combination of materials.

By installing the clamp 100 on the seam 130, a solar cell array or components thereof can be secured to the roof 120 without drilling into the roof 120. Because no screws are required to be drilled into the rooftop, the damage to the rooftop is substantially reduced. Also, by reversing the process described above, the clamp 100 can be uninstalled in a similar fashion.

FIGS. 2a to 2d show a cross-sectional view of a clamp 200 throughout various stages of installation according to an alternative exemplary embodiment. FIG. 2e shows a perspective view of an installed clamp according to an exemplary embodiment. FIG. 2f shows a perspective view of an installed clamp according to an exemplary embodiment. FIG. 2g shows an exploded perspective view of a clamp according to an exemplary embodiment. FIG. 2h shows an assembled perspective view of a clamp according to an exemplary embodiment. The clamp 200 shown in FIGS. 2a to 2h allows for more variation in the length of a bolt 260, as compared to clamp 100 shown in FIGS. 1a to 1d, and is described in more detail below.

Figure 2A:
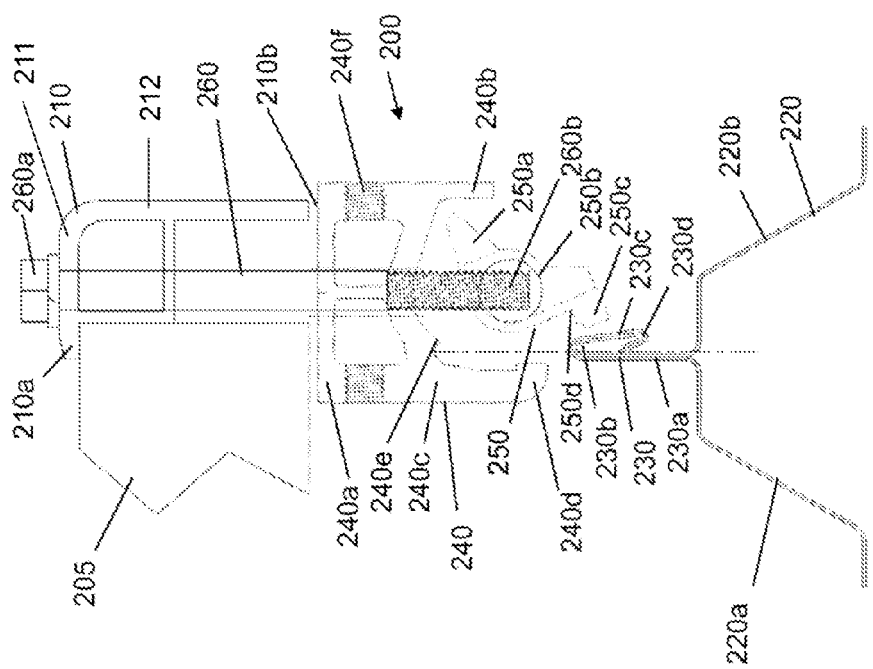
FIG. 2a shows a cross-section of a clamp in a first installation position according to an alternative exemplary embodiment.
Figure 3A:
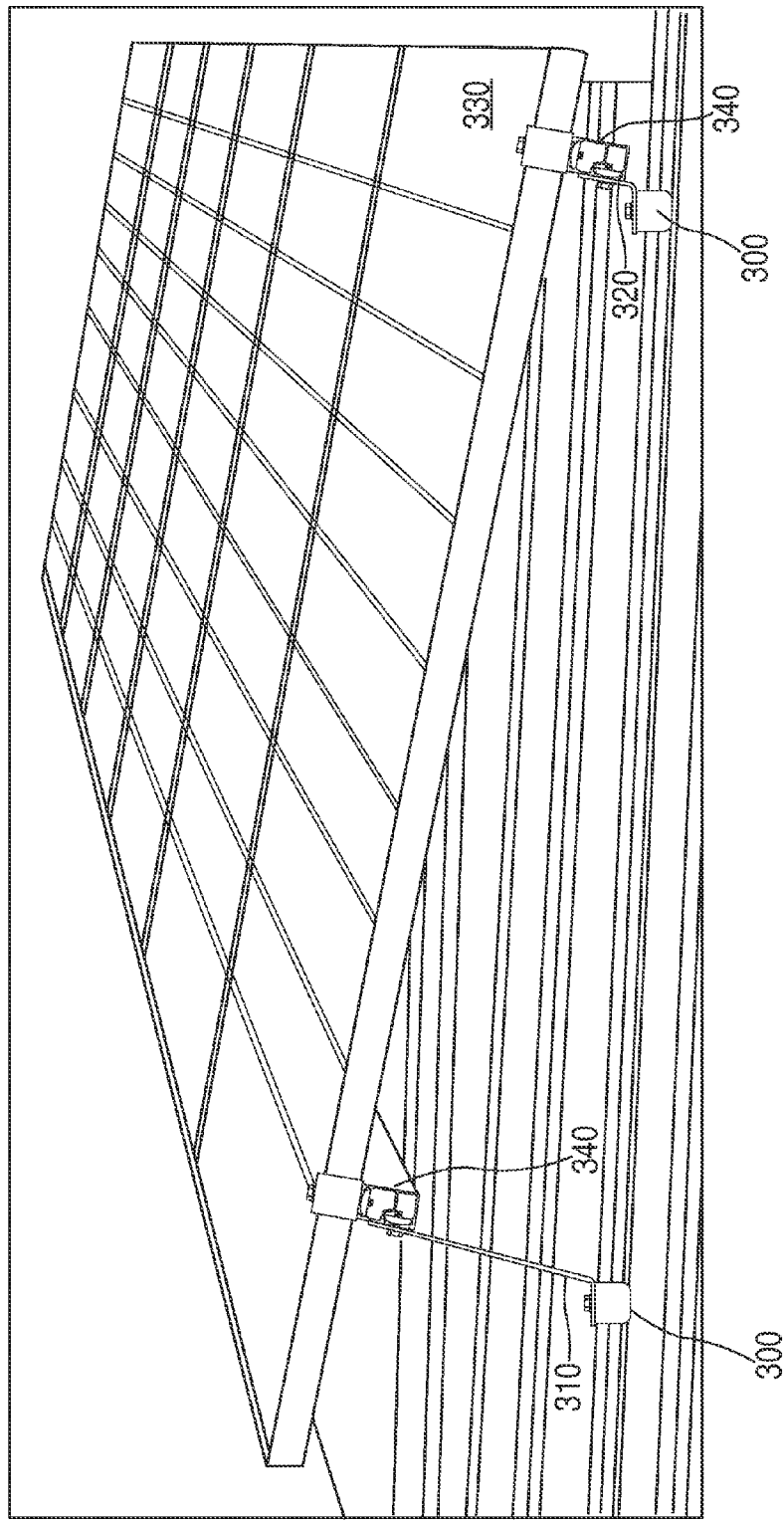
FIG. 3a is a perspective view of a module and clamp assembly according to an exemplary embodiment.

Referring to FIG. 2a, the clamp 200 can be used to secure or directly support a solar module 205 having a module end clamp 210. Although a solar module is described herein, it is intended to include any component of a solar cell array to be secured, including, but not limited to, a photovoltaic array, a photovoltaic module, a solar cell, a rail, a solar panel, a solar tracker, a mounting post or pole, and a mounting bracket. For example, as shown in FIGS. 3a and 3b, a clamp 300 can secure a long L-shaped bracket or tilt leg 310 and a short tilt leg 320. When a module 330 is secured to a rail 340, the tilt leg 320 can mount to the clamp 300 to support the rail 340. However, the term module is not intended to be limited to components used for solar energy and solar component installation. The module can apply to any component that can be secured to a roof, including, but not limited to, a satellite dish, an antenna, and HVAC equipment.

As shown in FIG. 4, a clamp 400 can also operate with a module mid clamp 410, as opposed to a module end clamp 210 as shown in FIGS. 2a-2h. The module mid clamp 410 can be positioned between two modules 420, 430.

The module end clamp 210 has a clamp flange 210a that extends over the module 205 from an upper surface component 211 to secure the module to a structure or roof. Optionally, the clamp flange 210a can have a ridged or toothed surface to assist with gripping the module 205. As the module end clamp 210 is fastened in a downward position, the module 205 will be secure between module end clamp flange 210a and clamp receiver horizontal component 240a. Although a module end clamp is shown, it is intended that the clamp 200 can be used with any structural member, such as an L-foot or rail.

The clamp 200 can secure the module end clamp 210 to a standing seam metal roof 220 having a seam 230. Seam 230 couples a first metal roof panel 220a and a second metal roof panel 220b. Seam 230 has a first vertical component 230a, a horizontal component 230b extending from the first vertical component 230a, a second vertical component 230c extending toward the roof 220 from the horizontal flange 230b, and an end component 230d that extends from the second vertical component 230c toward the first vertical component 230a. The seam 230 has an extension of roof panel 220a and roof panel 220b that extends throughout the seam 230 to produce a watertight seal. Although the exemplary embodiment depicts a standing seam metal roof having mechanical seam or crimp, it is intended that the clamp can be configured for or applied to a standing metal seam roof having a panel interlock.

The clamp 200 has a clamp receiver 240 and a clamp cam 250 configured to rotate into the clamp receiver 240. The clamp receiver 240 has a horizontal component 240a that supports the module 205 and abuts an end 210b of a vertical module end clamp component 212 of the module end clamp 210. The clamp receiver 240 has a cam receiving flange 240b extending vertically toward the roof 220 from the horizontal component 240a. The clamp receiver 240 also has a vertical component 240c extending toward the roof 220 from the horizontal component 240a, The vertical component 240c is positioned at a distal end of horizontal component 240a, whereas the cam receiving flange 240b is positioned at the other distal end of the horizontal component 240a. The vertical component 240c has an inwardly directed flange 240d that is operable to abut the seam 230. The clamp receiver 240 also has a seam receiving flange 240e configured to create a void between the seam receiving flange 240e and the vertical component 240c for receiving the seam 230. Optionally, the clamp receiver 240 can have a horizontal thread 240f configured for receiving a bolt to secure electrical conduit or other equipment that needs to be secured to the roof.

The clamp 200 has a cam 250 that rotates about a pivot point substantially near the corner where the horizontal component 240a and the cam receiving flange 240b are coupled. The cam 250 has a first cam component 250a that extends from the pivot point to a cam thread insert 250b. The cam insert 250b, as shown in FIG. 2g, is a cylindrical component that fits within cam 250. The cam insert 250b has a threaded aperture 255 for receiving the bolt 260, which when rotated, causes the cam insert 250b (along with the cam 250) to move up and down the bolt 260. A second cam component 250c extends from the cam thread insert 250b and forms a corner 250d. The second cam component 250c has a distal end configured to abut the seam 230. The corner 250d is configured to abut the seam 230 at the junction of the second vertical flange 230c and the end component 230d.

A torque bolt 260 extends from the upper portion surface component 211 of the module end clamp 210 and through the clamp 200 to the cam thread insert 250b. The bolt 260 has a polygonal component 260a at a distal end that extends beyond the module end clamp 210 and can be used to engage or disengage the bolt 260 from the cam thread insert 250b. It is intended that the bolt 260 can have any configuration at the distal end that allows a user to rotate the bolt or allows the bolt to engage the cam 250, such as a screwdriver receiving recess, and is not limited to a polygonal component, such as a hexagonal or pentagonal shaped component. At the other end of the module end clamp 210, the bolt 260 has a threaded component 260b that extends through the horizontal component 240a to the cam thread insert 250b. The cam thread insert 250b has a thread that is configured to receive the threaded component 260b of the bolt 260.

As shown in FIG. 2a, the installation process begins with the clamp 200 having the cam 250 in an open position and the bolt 260 is not extended into the cam thread insert 250b. As the installation process continues, the clamp 200 is lowered onto the seam 230 and the bolt 240 engages the cam thread insert 250b to rotate the cam 250 into position abutting the seam 230.

Figure 2B:
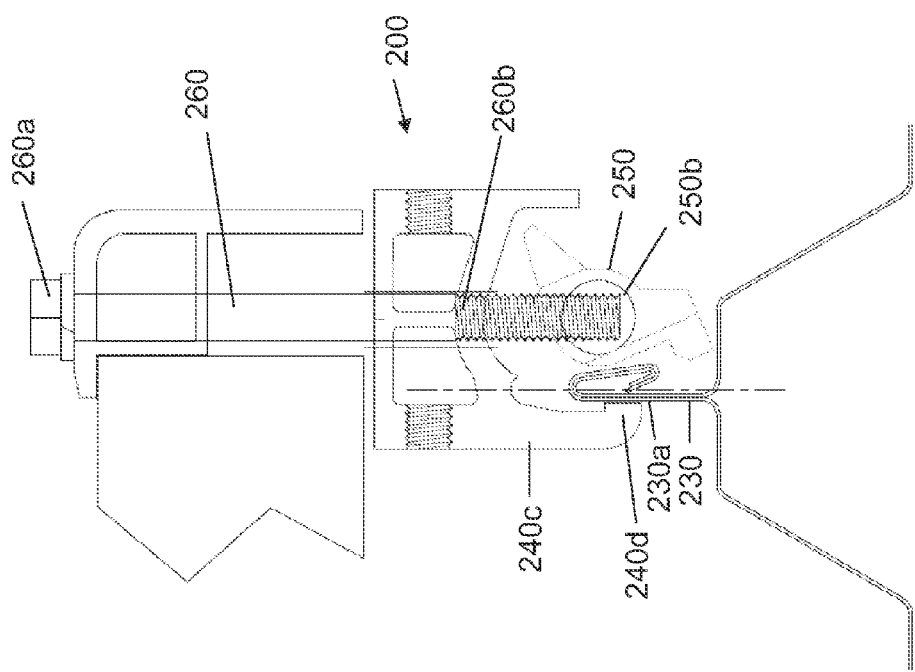
FIG. 2b shows a cross-section of a clamp in a second installation position according to an alternative exemplary embodiment.

FIG. 2b shows the clamp 200 being lowered onto the seam 230. By rotating the polygonal component 260a of the bolt 260, the threaded component 260b engages the cam thread insert 250b and causes the cam 250 to rotate and towards the vertical component 240c. The inwardly directed flange 240d of the vertical component 240c abuts the first vertical flange 230a of the seam 230.

FIG. 2c shows the clamp 200 being lowered further onto the roof 220. As the bolt 260 is rotated, the cam 250 continues to rotate to engage the seam 230. The horizontal component 230b of the seam 230 abuts the void between the seam receiving flange 240e and the vertical component 240c. The inwardly directed flange 240d remains abutted against the vertical component 230a of seam 230. The second cam component 250c also abuts the vertical component 230a of seam 230. In this position in installation, the cam 250 has been rotated to substantially close the opening to secure the clamp 200 to seam 230.

Figure 2D:
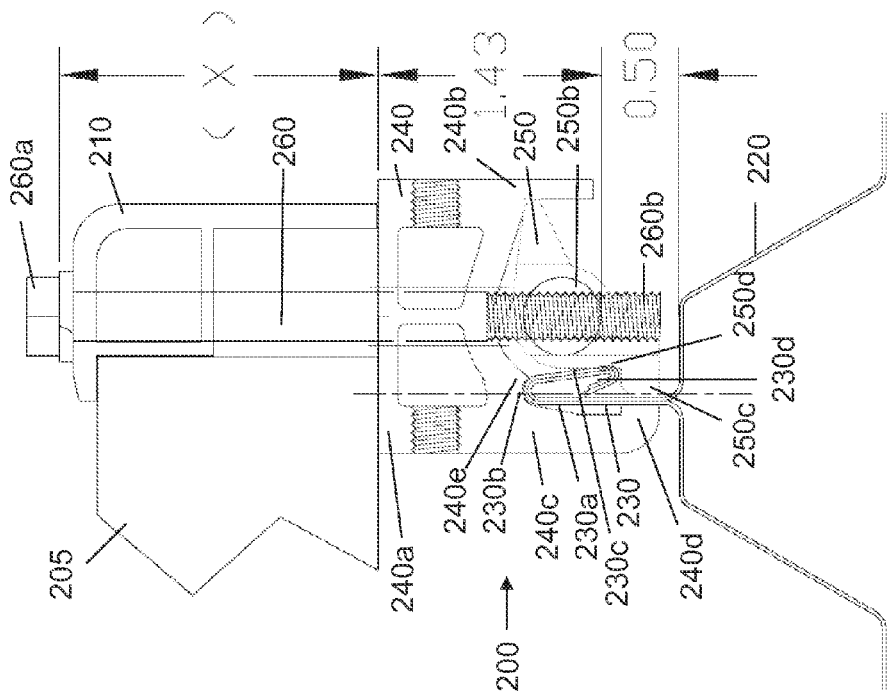
FIG. 2d shows a cross-section of a clamp in a fourth installation position according to an alternative exemplary embodiment.
Figure 2E:
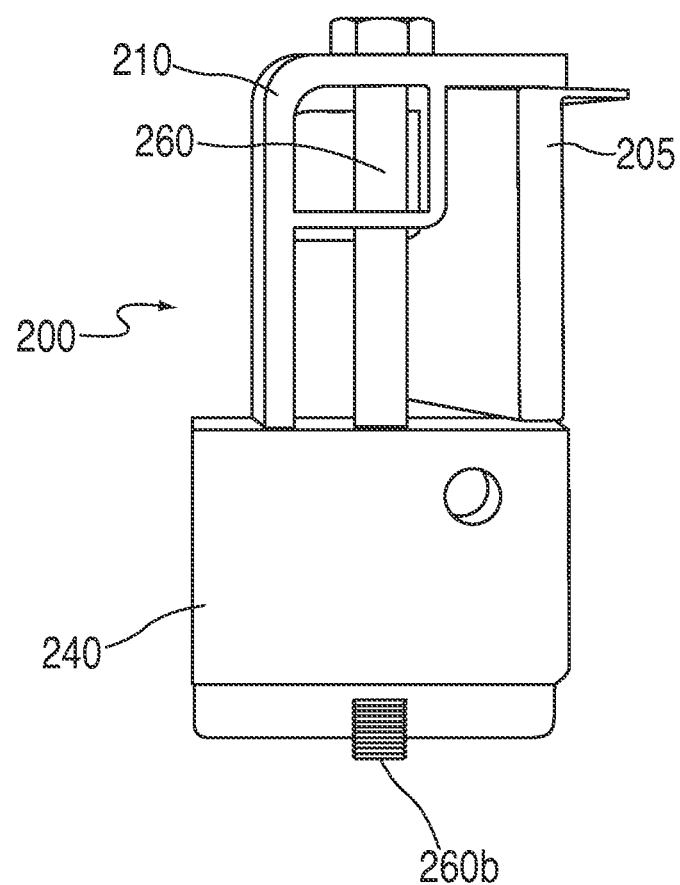
FIG. 2e shows a perspective view of an installed clamp according to an exemplary embodiment.
Figure 2F:
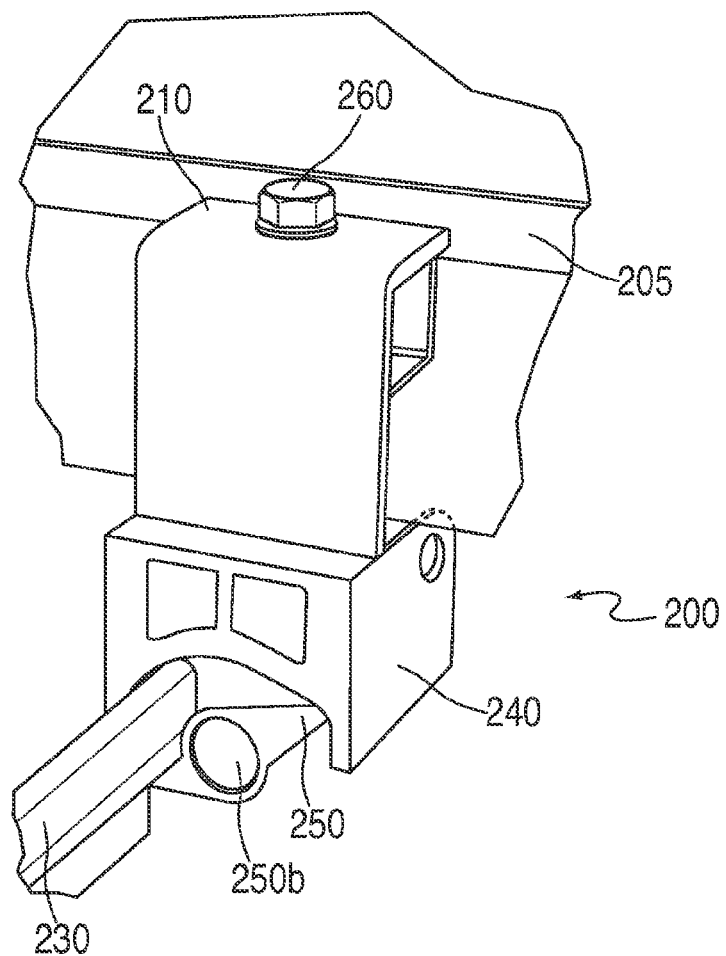
FIG. 2f shows a perspective view of an installed clamp according to an exemplary embodiment.
Figure 2G:
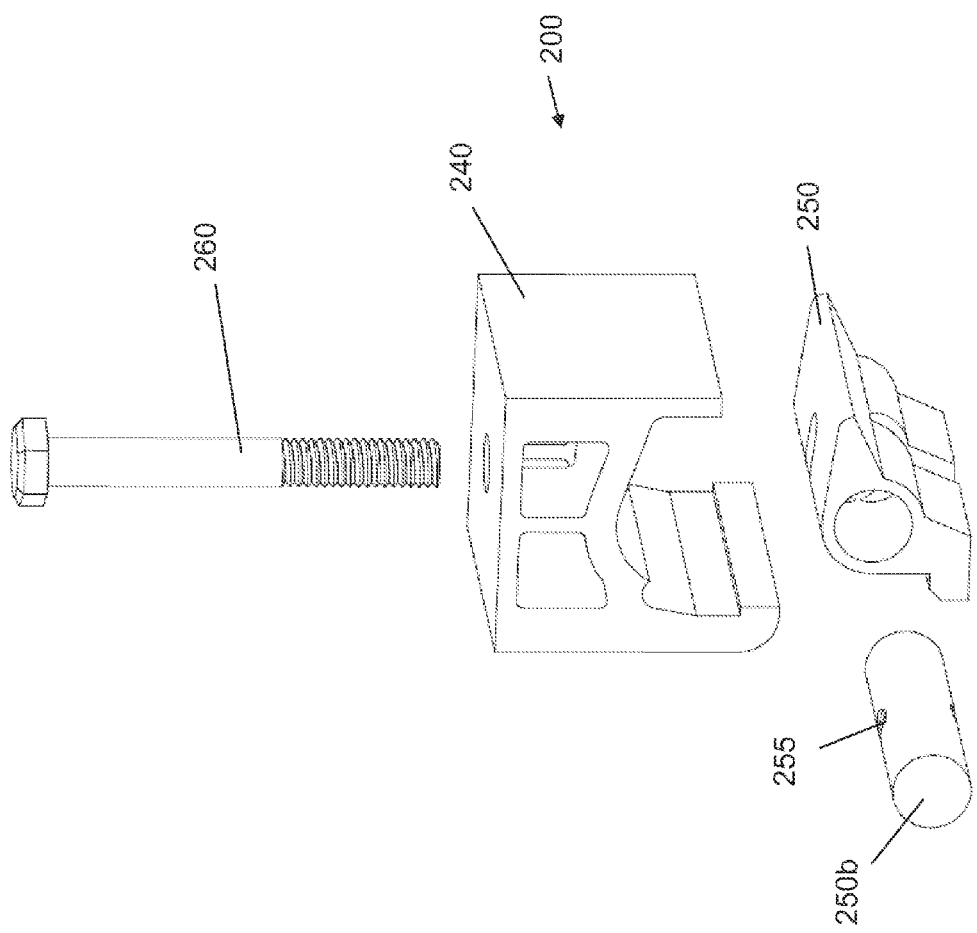
FIG. 2g shows an exploded perspective view of a clamp according to an exemplary embodiment.
Figure 2H:
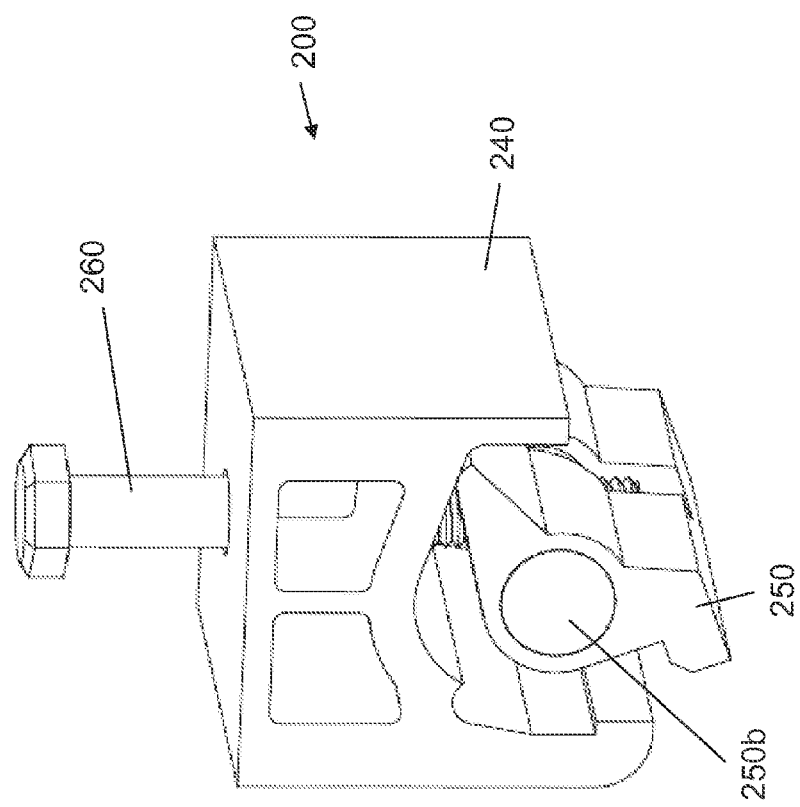
FIG. 2h shows an assembled perspective view of a clamp according to an exemplary embodiment.

FIG. 2d shows a tightening of the clamp 200 to the seam 230. The polygonal component 260a of bolt 260 can be rotated until the clamp 200 is in a desired securing position. In one exemplary embodiment, the bolt 260 is rotated to 10 ft-lbs. The threaded component 260b of the bolt 260 continues to engage the cam thread insert 250b until the cam 250 is substantially in a final, secure position and the cam 250 cannot be rotated further. In this final position, as shown in FIG. 2d, the inwardly directed flange 240d remains abutted against the vertical component 230a of seam 230. The horizontal component 230b of the seam 230 abuts the void between the seem receiving flange 240e and the vertical component 240c. The second cam component 250c abuts the vertical component 230a of seam 230. The corner 250d abuts the seam 230 at the junction of the second vertical flange 230c and the end component 230d. Accordingly, the cam 250 cannot rotate further because the cam 250 is pressed against the seam 230 at these two points. Also, by tightening the bolt 260, the module end clamp 210 is secured against the clamp 200. As a result, the module 205 is secured between the flange 210a and the horizontal component 240a of the clamp receiver 240.

Once the clamp 200 is secured to seam 230, as shown in FIG. 2d, the threaded component 260b extends beyond the cam thread insert 250b. Because the bolt 260 is available in a variety of lengths, the threaded component 260b can extend a varied amount, depending upon the height of the module end clamp 210. As shown in this exemplary embodiment, the module end clamp has a height (X), the distance from an upper end of the cam receiver 240 to the bottom of the cam receiving flange 240 is about 1.43 inches, which allows about 0.5 inches of the threaded component 260b to extend without abutting the roof 220.

The clamp 200, including the clamp receiver 240, cam 250, and bolt 260, can be composed of any known or convenient material, including, but not limited to metal, fiberglass, plastic, wood, composites or any other combination of materials. The clamp 200 can be manufactured by any process known in the art, including extrusion and cold-forging.

By installing the clamp 200 on the seam 230, a solar cell array or components thereof can be secured to the roof 220 without drilling into the roof 220. Because no screws are required to be drilled into the rooftop, the damage to the rooftop is substantially reduced. Also, by reversing the process described above, the clamp 200 can be uninstalled in a similar fashion.

In an alternative embodiment, as shown in FIG. 5, a clamp 500 has a cam receiver 510 has a downward extending flange 510a. A cam 520 has a first component 520a extending to a rounded end 520b. The downward extending flange 510a is configured to substantially receive rounded end 520b such that rounded end 520 substantially acts as a pivot point for the rotation of the cam 520 within the cam receiver 510. For example, the rounded end 520b and the downward extending flange 510a can have a ball-and-socket configuration.

The embodiments described above are intended to be exemplary. One skilled in the art recognizes that numerous alternative components and embodiments that may be substituted for the particular examples described herein and still fall within the scope of the invention.

What is claimed is:

1. A clamp for securing a module to a roof seam, the clamp comprising:
   a cam receiver comprising:
      a horizontal component comprising a cam-receiver aperture; and
      a cam-receiving component extending perpendicularly from a first end of the horizontal component; and
   a cam, comprising:
      a cylindrical cavity;
      a first cam component extending in a first direction from the cylindrical cavity; and
      a cam insert inserted into the cylindrical cavity, the cam insert comprising a threaded aperture; and
   a bolt extending through the cam-receiver aperture and threadably engaging the threaded aperture, wherein tightening the bolt into the threaded aperture causes the cam to rotate into the cam receiver about an axis of rotation substantially perpendicular to a longitudinal axis of the bolt.

2. The clamp of claim 1, wherein a corner between the horizontal component and the cam-receiving component forms a pivot point for the cam.

3. The clamp of claim 2, wherein the first cam component engages the pivot point as the bolt is tightened in the threaded aperture.

4. The clamp of claim 1, wherein the cam comprises:
   a longitudinal slot open to the cylindrical cavity for receiving the bolt.

5. The clamp of claim 1, the cam receiver further comprising:
   a seam engaging component extending perpendicularly from a second end of the horizontal component.

6. The clamp of claim 5, wherein the seam engaging component comprises an inwardly directed flange configured to abut a surface of the roof seam.

7. The clamp of claim 5, the cam receiver comprising:
   a horizontal thread extending through the cam-receiving component and the seam engaging component.

8. The clamp of claim 5, the cam receiver further comprising:
   a seam receiving flange extending perpendicularly from the horizontal component configured to receive the roof seam between the seam receiving flange and the seam engaging component.

9. The clamp of claim 1, further comprising:
   a structural member fastened to the horizontal component with the bolt.

10. The clamp of claim 9, wherein the structural member comprises a module end clamp, the module end clamp comprising a clamp flange for securing the module to the horizontal component.

11. The clamp of claim 10, wherein the clamp flange comprises one of a ridged surface and a toothed surface.

12. The clamp of claim 9, wherein the structural member comprises a mid clamp comprising two clamp flanges for securing the module and an additional module to the horizontal component.

13. The clamp of claim 9, wherein the structural member comprises one of an L-foot and a rail.

14. The clamp of claim 1, wherein the first cam component comprises a rounded end.

15. The clamp of claim 14, the cam-receiving component comprising:
   a rounded cavity configured to receive the rounded end such that the rounded end acts as a pivot point for rotation of the cam within the cam receiver.

16. A system, comprising:
   a clamp for securing a module to a roof seam, the clamp comprising:
      a cam receiver comprising:
         a horizontal component comprising a cam-receiver aperture; and
         a cam-receiving component extending perpendicularly from a first end of the horizontal component; and
      a cam, comprising:
         a cylindrical cavity;
         a first cam component extending in a first direction from the cylindrical cavity; and
         a cam insert inserted into the cylindrical cavity, the cam insert comprising a threaded aperture; and
      a bolt extending through the cam-receiver aperture and threadably engaging the threaded aperture, wherein tightening the bolt into the threaded aperture causes the cam to rotate into the cam receiver about an axis of rotation substantially perpendicular to a longitudinal axis of the bolt; and
   the roof seam.

17. The system of claim 16, the cam further comprising:
   a second cam component extending in a second direction from the cylindrical cavity, wherein the second cam component is configured to abut the roof seam when the bolt is tightened in the threaded aperture.

18. The system of claim 17, the roof seam comprising:
a first vertical component extending away from a roof;
a horizontal flange extending from the first vertical component;
a second vertical component extending from the horizontal flange toward the roof; and
an end component that extends from the second vertical component toward the first vertical component.

19. The system of claim 18, wherein the second cam component comprises a corner configured to abut the roof seam at a junction between the second vertical component and the end component.

20. The system of claim 16, further comprising:
the module, wherein the module is secured to the horizontal component with the structural member.

* * * * *